United States Patent [19]

Reusch et al.

[11] Patent Number: 4,468,991

[45] Date of Patent: Sep. 4, 1984

[54] TOOL TURRET

[75] Inventors: Walter Reusch, Dettingen/Erms; Günther Schips, Kappishäusern, both of Fed. Rep. of Germany

[73] Assignee: Sauter Feinmechanik GmbH, Metzingen, Fed. Rep. of Germany

[21] Appl. No.: 413,661

[22] Filed: Sep. 1, 1982

[30] Foreign Application Priority Data

Sep. 4, 1981 [DE] Fed. Rep. of Germany ....... 3134970

[51] Int. Cl.³ .............................................. B23B 29/32
[52] U.S. Cl. .................................. 82/36 A; 74/813 L
[58] Field of Search .............. 82/36 A; 74/813 L, 826

[56] References Cited

U.S. PATENT DOCUMENTS 3,718,055  2/1973  Maier ................................. 74/813 L
4,015,487  4/1977  Pfister ................................ 74/813 L
4,202,227  5/1980  Thumm .................................. 82/36

FOREIGN PATENT DOCUMENTS 1627051  10/1970  Fed. Rep. of Germany .
2849167   5/1980  Fed. Rep. of Germany .

Primary Examiner—Leonidas Vlachos
Attorney, Agent, or Firm—Walter C. Farley

[57] ABSTRACT

A tool turret has a housing and a revolving tool head which can be locked relative to the housing by means of gear teeth including annular toothed rings with axially extending teeth which can be interlocked in different rotational positions. A device having a cam drive controls the selective locking and unlocking of the gear teeth, the cam drive being arranged coaxial to the shaft. A Geneva wheel is provided to drive the head unlocked by the gear teeth. The cam drive has an annular groove in which rides a cam follower which is mounted on a axially movable, annular locking element which carries one set of teeth. The set of teeth can be removed axially to concurrently engage rings of teeth on the head and the fixed housing, locking the head.

5 Claims, 3 Drawing Figures

TOOL TURRET

This invention relates to a tool turret of the type which is rotatable to a plurality of angular positions, the turret including a rotatable head, a housing and drive means for rotating the head to any of the positions.

BACKGROUND OF THE INVENTION

In a known tool turret of the type which the invention relates, an example of which is shown in German Pat. No. 16 27 051, a cam drive is provided for disengaging facing gear teeth, and another cam drive is provided for engaging the facing teeth. In this apparatus, the rotating head must be lifted out during the disengagement of the teeth and reinserted for reengagement thereof, so that the teeth will mesh again. The cam drive for disengaging the teeth includes an axial cam which works on the rotating head through a lug and a multiple-disc brake which creates the danger of force being applied excessively to one side. The cam drive for engaging of the teeth includes a radial cam which acts on gear teeth through a toggle lever mounted on the rotating head. This apparatus for selectively engaging and disengaging the facing teeth is very costly and occupies a considerable amount of space.

In another known tool turret shown in German Auslegeschrift No. 28 49 167, the cam drive has a member with an annular groove into which fits a guide member which is attached to a lever. A control element which rotatably supports the member with the annular groove in it is mounted on an axis parallel with the axis of the rotating head. The axis of the rotating head passes through the annular lever which acts on its shaft by means of a toggle lever coupling against the force of a spring when the gear teeth arrangement is to be engaged. This embodiment of the tool turret requires two shafts arranged side-by-side and, therefore, also uses much space and is expensive.

A multiple tool holder for machine tools has an angular locking part is also known, an embodiment of this being shown in German Offenlegungsschrift No. 27 41 907 and U.S. Pat. No. 4,202,227. This locking apparatus has a locking part with teeth on a facing side and axial cams on its other facing side by which the locking part can be axially forced against the bias of a spring. The other teeth of the facing teeth cooperating with those mounted on the locking part, and belonging to the facing gear teeth, are mounted on the rotating head and on a stationary part coaxial therewith. The facing cams on the locking part and on the stationary part of the multiple tool holder are permanently under spring bias, which creates increased frictional resistance.

BRIEF DESCRIPTION OF THE INVENTION

An object of the present invention is to construct a rotatable tool turret which is simple in construction and operation and which occupies minimum space.

Briefly described, the invention includes a tool turret of the type comprising a housing, a rotatable tool head and drive means for rotating the head to any of several rotational positions wherein the drive means comprises the combination of a drive shaft; cam drive means for selectively locking and unlocking the rotatable head, said cam drive means comprising an axially movable locking element mounted coaxially with said drive shaft and having a first annular set of axially extending gear teeth at one end thereof, a control element concentric with said shaft; and means around said element defining an annular cam groove; means on said housing for rotatably supporting said tool head coaxially on said drive shaft; means on said tool head defining a second annular set of axially facing gear teeth extending toward and at least partially overlapping said first set of teeth on said locking element; a stationary gear ring fixedly attached to said housing, said gear ring having a third annular set of axially facing gear teeth concentric with and lying in substantially the same plane as said second set and partially overlapping said first set; and cam follower means mounted in said locking element and engaging said cam groove, whereby axial movement of said locking element locks said head against rotational movement when said first set of teeth simultaneously engages said second and third sets and releases said head for movement when said teeth are disengaged.

The investment to construct a tool turret in accordance with the invention is very low. It facilitates rapid, exact adjustment, even with a large load. The arrangement of the annular groove coaxially with the axis of the rotating head, the use of an annular locking part coaxial with the rotating head, which supports the teeth on one side of the facing gear teeth, and the teeth of the facing gear teeth found on the other side in two coaxial rings, of which one ring is connected with the rotatable head and the other is stationary and wherein the two rings are overlapped by the teeth on the locking part, make space-saving construction possible, particularly because of the omission of one shaft parallel to the axis rotating head. The guide member is fixed in the annular groove and therefore is properly guided.

Further features of the apparatus allow the teeth of the sets of teeth lying opposite each other to mesh precisely with each other without excessive axial stress on the teeth.

An energy saving drive of the turret is attained by further features since the spring for pressing the teeth into engagement is only effective when the teeth are meshed together and there is no axial urging when the teeth are not meshed.

In order that the manner in which the foregoing and other objects are attained in accordance with the invention can be understood in detail, a particularly advantageous embodiment thereof will be described with reference to the accompanying drawings, which form a part of this specification and wherein.

Figure 1A:
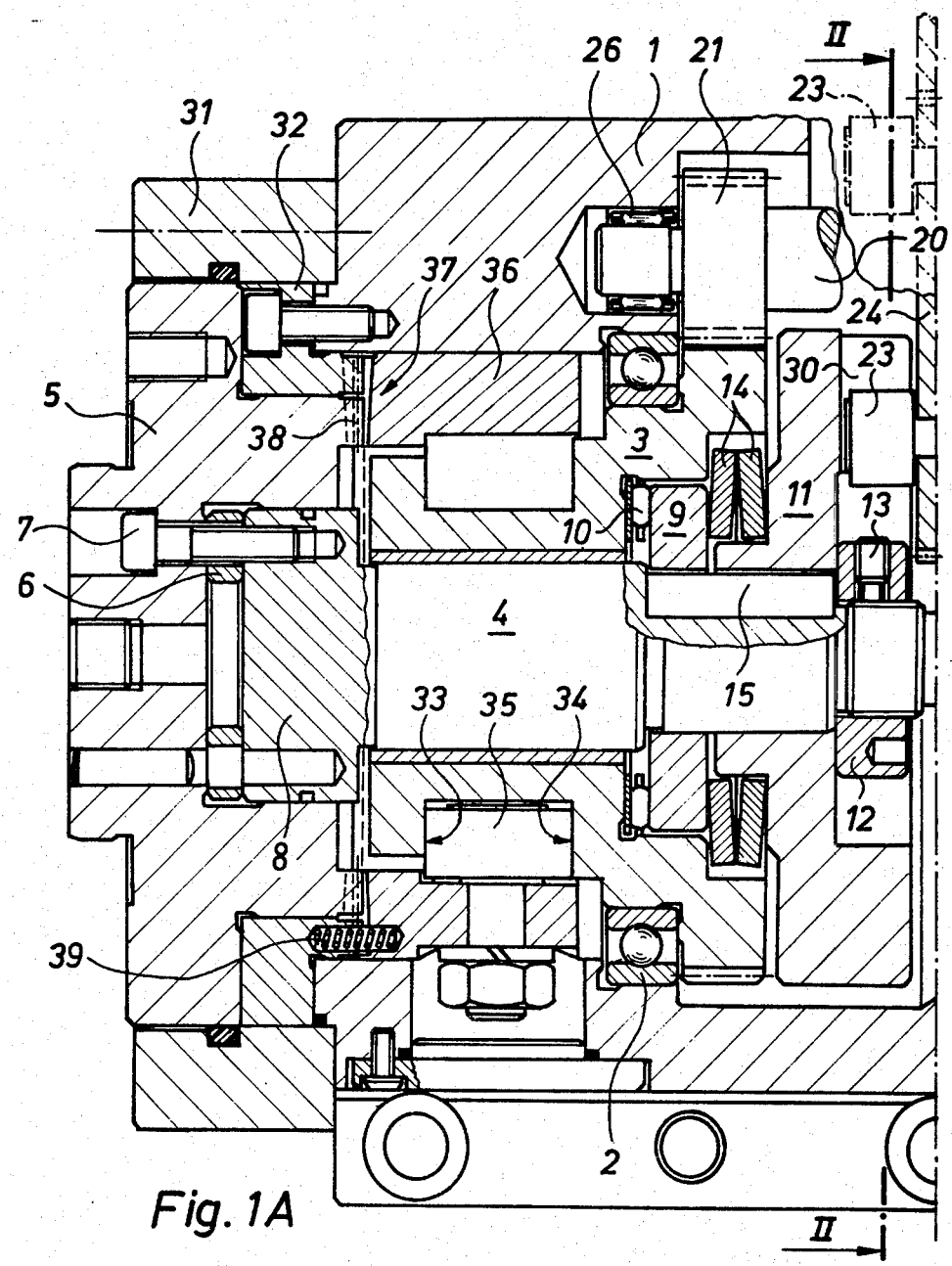
FIG. 1A is a side elevation, in section along line IA—IA of FIG. 2.

As shown particularly in FIG. 1A, the apparatus includes a hollow cylindrical control element 3 which is rotatably mounted on roller bearings 2 in a housing 1 which can form part of a machine tool on a frame, the machine tool not being illustrated. Control element 3 serves as a support bearing for a coaxial stepped shaft 4 which carries a rotatable head 5 at one end, the left end in the figure. The rotatable head 5 is coupled to the end of shaft 4 with a replacable spacing ring 6 in between, the components being held together by screws 7 extending through the head and ring and into the end face of a radially enlarged portion 8 of shaft 4.

Figure 1B:
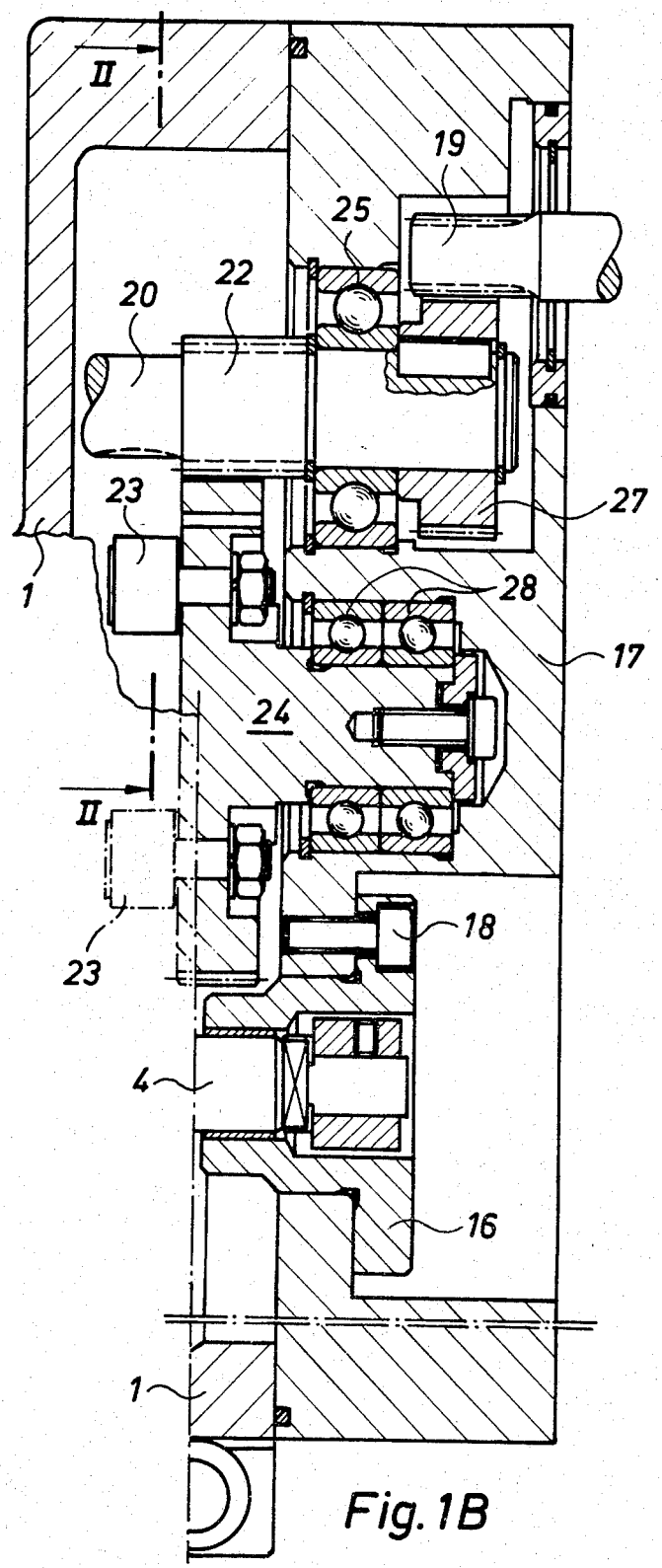
FIG. 1B is a plan view in section, along line IB—IB of FIG. 2, FIG. 1B constituting a continuation of FIG. 1A viewed from a different angle, the parts common to both figures being shown in double lines.

An annular support ring 9 of an axial bearing rides against rollers 10 which abut against a surface of control element 3 axially facing and adjacent to ring 9. A Geneva wheel 11 surrounds shaft 4 and is held on the side of element 3 which faces away from revolving head 5 by means of a nut 12 screwed onto a stepped, externally threaded portion of shaft 4 shown at the right side of the drawing. All of elements 3, 9, 11, and 12 are supported on that part of shaft 4 which extends away from head 5. A radially extending threaded set screw 13 serves to fix nut 12 in place. Two cup springs 14 are arranged between Geneva wheel 11 and support ring 9. A key insert 15 forms a nonrotating connection of support ring 9 and Geneva wheel 11 with shaft 4 in tongue and groove fashion. The right end of shaft 4 (FIG. 1B) is rotatably mounted in a bearing 16 which is attached to a housing cover 17 by means of screws 18. Housing cover 17 covers the right side of housing 1. A drive motor, not shown, is attached to housing cover 17 and has a drive shaft coupled to a drive pinion 19 which projects through an opening in housing cover 17.

Figure 2:
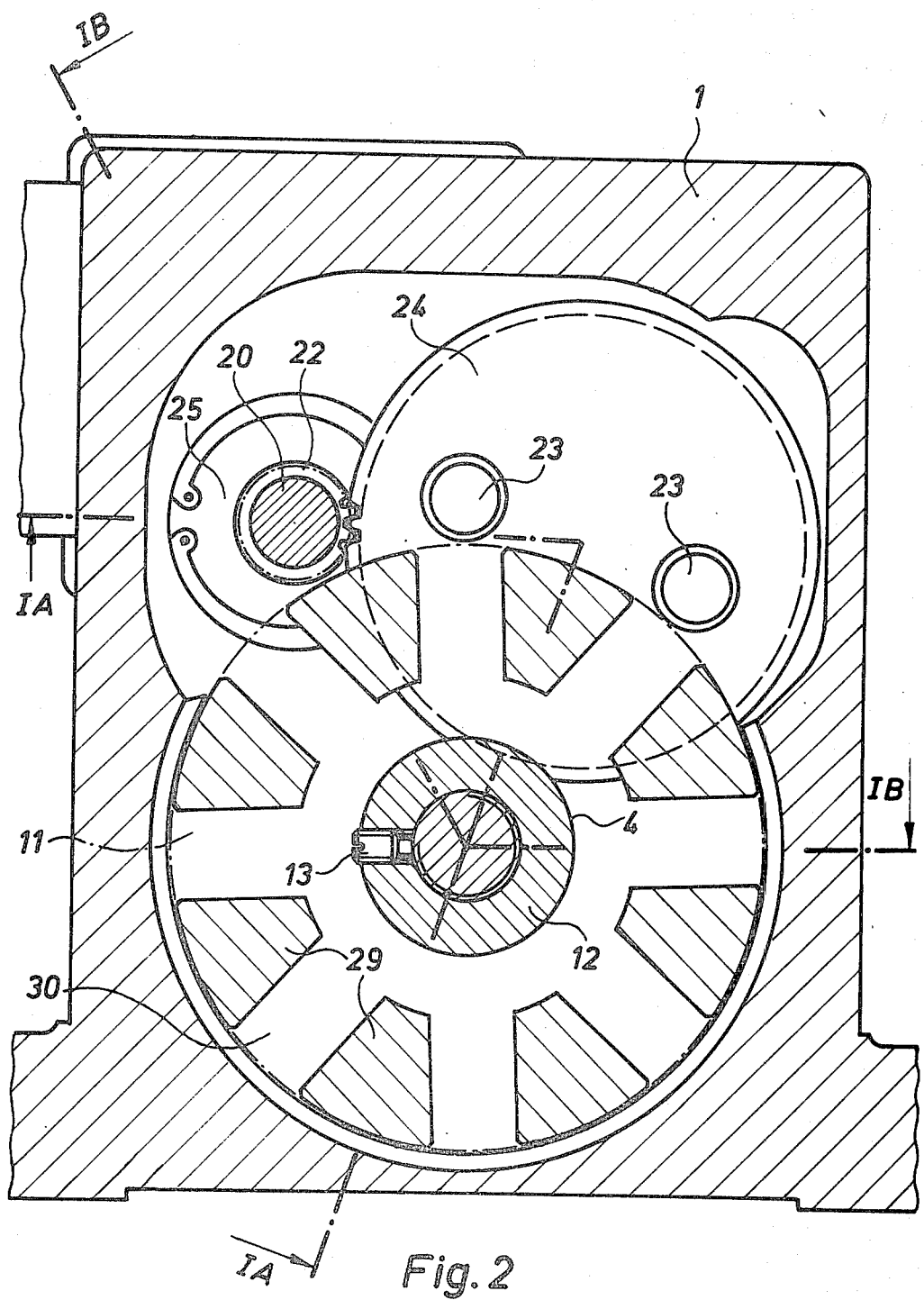
FIG. 2 is a transverse sectional view along line II—II which extends through FIGS. 1A and 1B.

A shaft 20 which carries two pinions 21 (FIG. 1A) and 22 (FIG. 1B) axially spaced from each other, is rotatably mounted at one of its ends in housing cover 17 and at the other end in housing 1. Pinion 21 meshes with radially protruding peripheral gear teeth on control element 3 and pinion 22 meshes with similar teeth on a drive disc 24 carrying two driving pins 23. Shaft 20 is supported at one end by a roller bearing 25 in housing cover 17 and at the other end by a needle roller bearing 26 in housing 1. Roller bearing 25 is between a pinion 27, meshing with drive pinion 19, and pinion 22. Drive disc 24 is cantilever mounted in housing cover 17 by roller bearing 28. As best seen in FIG. 2, Geneva wheel 11 has radially extending grooves 30 between eight axially protruding segment cams 29 for meshing with driving pins 23 of drive disc 24 which cooperate, in a known manner, with the Geneva wheel 11.

Rotatable head 5 is surrounded by an annular housing 31 which is fixedly attached to housing 1. A toothed ring 32 is also attached to housing 1 in an annular recess in rotatable head 5 which opens toward control element 3. The teeth on ring 32 constitute an annular arrangement of axially facing gear teeth extending in the general direction of element 3. Control element 3 has an annular groove on its outside periphery defined by two facing walls 33 and 34, which groove forms a lifting cam operating in both axial directions. Rollers 35 which are arranged opposite each other fit between walls 33 and 34, each of the rollers being rotatably mounted on a locking element 36 which is axially movable. Locking element 36 is formed with a toothed ring 37 on its side adjacent to roller head 5, and the axially extending teeth of ring 37 lie opposite the teeth of ring 32 and also the teeth of a toothed ring 38 formed on revolving head 5. The teeth in the sets of teeth on rings 32 and 38 lie in the same plane and, considered together, have approximately the same radial extent as the radial extent of the teeth on ring 37. When locking element 36 is in its end position toward the left, as shown in the drawing, the radial gear teeth are fixed or locked to each other because the teeth of ring 37 simultaneously mesh with the teeth of both of rings 32 and 38. If the locking element 36 is in its other end position toward the right, then the sets of teeth on rings 32, 37 and 38 are disengaged from each other. Compression coil springs 39 are clamped in recesses on the peripheries between rings 32 and 36 where they are arranged with their axes parallel to that of rotating head 5.

When drive pinion 19 is driven, drive disc 24 and control element 3 are rotated continuously. Geneva wheel 11, however, is driven in a stepwise fashion only when the teeth of ring 37 on the one hand and rings 32 and 38 on the other hand are not meshed together, i.e., when the facing gear teeth have been disengaged by axial movement of rollers 35 and element 36. Following turning of revolving head 5 through one step, the angular extent of which is determined by the number of grooves 30 in Geneva wheel 11, (there being eight grooves in the embodiment shown) the teeth of the facing gears for rings 37, 32 and 38 mesh together again. Walls 33 and 34 of the control groove on the periphery of control element 3 are configured correspondingly. After rotatably head 5 has reached its new position, the drive power is automatically disconnected until the next movement is to occur.

While one advantageous embodiment has been chosen to illustrate the invention, it will be understood by those skilled in the art that various changes and modifications can be made therein without departing from the scope of the appended claims.

What is claimed is:

1. A tool turret of the type comprising a housing, a rotatable tool head and drive means for rotating the head to any of several rotational positions wherein the drive means comprises the combination of
   a drive shaft;
   cam drive means for selectively locking and unlocking the rotatable head, said cam drive means comprising:
      an axially movable locking element mounted coaxially with said drive shaft and having a first annular set of axially extending gear teeth at one end thereof,
      a rotatable control element concentric with said shaft;
      means for rotating said control element;
      means around said control element defining an annular cam groove;
   means on said housing for rotatably supporting said tool head coaxially on said drive shaft;
   means on said tool head defining a second annular set of axially facing gear teeth extending toward and at least partially overlapping said first set of teeth on said locking element;
   a stationary gear ring fixedly attached to said housing, said gear ring having a third annular set of axially facing gear teeth concentric with and lying in substantially the same plane as said second set and partially overlapping said first set; and
   cam follower means mounted in said locking element and engaging said cam groove, whereby axial movement of said locking element in response to rotation of said control element locks said head against rotational movement when said first set of teeth simultaneously engages said second and third sets and releases said head for movement when said teeth are disengaged.

2. A turret according to claim 1, wherein said drive means includes
   a Geneva wheel axially immovably mounted for rotation with said shaft;
   said turret further comprising a compression spring between said Geneva wheel and said control element.

3. A turret according to claim 2 wherein said compression spring acts on said teeth only when said teeth are meshed together for the locking of said tool head.

4. A turret according to claim 3 and including a spacing ring between said shaft and said tool head for adjusting the active positions of said spring and said cam drive means.

5. A turret according to claim 1 wherein said annular cam groove comprises an axially varying closed path with inwardly facing side walls, and said cam follower means includes a roller riding between said side walls.

* * * * *